UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 572,135, dated December 1, 1896.

Original applications filed July 26, 1895, Serial No. 557,236, and November 7, 1895, Serial No. 568,212. Divided and this application filed August 22, 1896. Serial No. 603,659. (No specimens.)

*To all whom it may concern:*

Be it known that I, JOHN H. STEVENS, a citizen of the United States, residing at the city of Newark, county of Essex, and State of New Jersey, have invented certain new and useful Improvements in Pyroxylin Compounds, of which improvements the following is a specification.

This invention relates to the manufacture of pyroxylin compounds used in the arts, by which I mean those compounds which dry to a hard substance, either in the shape of thick masses used to imitate such materials as ivory, tortoise-shell, &c., or thin films useful as sheets or protective coatings. It is well understood that the stiffness and fluidity of the original mixtures depend upon the proportion of solvent used in the compound, and also that solvents are of two kinds—solids and liquids—which, though often used singly, are generally, for the best effects, employed in combination with each other.

The distinctive novelty of the present invention consists in the employment, in combination with soluble pyroxylin, of a group of certain solid substances chemically related to each other. By a series of experiments I have ascertained that each member of the said group is practically useful in this manufacture; that is, each possesses either the property of dissolving nitrocellulose when melted by heat or of being useful in connection with other solvents. They also form valuable combinations with pyroxylin, making new compositions of matter possessing practical utility and new properties.

The importance of extending the list of solvent substances for use in these compounds is now generally recognized, as the variety of effects desired in manipulating the combinations or in employing the final products require that the operator shall be possessed of a wide range of substances useful as ingredients.

The present group of solvents comprises certain crystalline organic sulfur compounds, as follows: trional, or diethylsulfonmethylethylmethane, $C_2H_5CH_3.C(SO_2C_2H_5)_2$, sulfobenzid, or diphenylsulfon, $(C_{12}H_{10}SO_2,)$ sulfonal, or diethylsulfondimethylmethane, $(CH_3)_2C(SO_2C_2H_5)_2$, and sulfocarbanilid, or s-diphenylthiocarbamide, $CS(NH.C_6H_5)_2$.

While it is generally desirable that solid substances used for solvent purposes in this art should be solvents of pyroxylin in themselves, there are other properties required of them which often render non-solvent substances of use. This is equally true of liquid solvents. For instance, alcohol, which is practically a non-solvent in itself, forms a good solvent when camphor is mixed with it. Frequently individual substances, while not possessing solvent powers in themselves, form solvents with other non-solvent substances. For instance, ether and alcohol, both non-solvents, become capable of dissolving pyroxylin when mixed together.

The action of solid solvents is quite distinct from that of liquids in that the solid solvent, after the seasoning or drying of the material, remains a part of the finished product and gives the property of plasticity under heat, as is well understood. Although numerous solid solvents have been discovered and applied, camphor is still regarded as a solvent of great importance in this art, notwithstanding the difficulties attending its use. Hence special attention has been directed to so modifying the action of the camphor that its excellent solvent powers and other characteristics could be advantageously utilized.

The principal objection to the use of camphor is its high melting-point, which necessitates the use of so much heat in molding the thoroughly-dried compounds containing camphor that there is a tendency to discoloration. This difficulty has been met to a certain extent by leaving in the final product a small proportion of liquid solvent, such as alcohol, which lowers the melting-point of the camphor and permits the manipulation of the compounds without destroying the good qualities of the material. There is such a wide difference, however, between the volatility of the camphor and the liquid menstruum or liquid menstrua employed with it that it is difficult to control the plastic properties by such means, because the relative proportion of camphor and the liquid solvent varies according to the conditions of evaporation or seasoning.

It is the object of the present invention to form pyroxylin compounds in such a manner that their plasticity will be independent of the presence of liquids in the compounds. The group of substances enumerated not only contains solid solvents, but also substances which can be employed with camphor to produce compounds which are plastic at lower temperatures than those made with camphor, even though the substances so employed do not possess solvent powers in themselves. All of the members of this group, whether they are solvents or not, combine to form solvents; that is, solvents which when melted by means of heat dissolve pyroxylin.

With the exception of sulfocarbanilid these substances can all be employed in the production of colorless products. Sulfocarbanilid must only be used for dark colors like black, brown, green, &c.

Sulfobenzid and sulfocarbanilid are too weak in solvent action to be employed alone as substitutes for camphor. The sulfonal and trional are fairly strong solvents of pyroxylin when melted. They can be used in place of camphor as converting agents for pyroxylin. All of the members of the group, however, can be used in connection with camphor. They all possess the power of lowering the melting-point of the camphor, and thus remove one of the annoying features of the processes in which camphor is employed as the solid solvent.

In the course of my experiments I have found that acetone is the best liquid menstruum to employ with these new solid solvents; but when these new solid substances are employed with camphor other liquid solvents, like alcohol and wood-spirit, can be employed successfully, especially as the camphor is increased in amount.

The trional is especially soluble in acetone. Sulfonal works best with a mixture of liquid solvents, say a mixture of wood-spirit and acetone. Sulfonal dissolves better in acetone when it is used in connection with tolypyrin, (a substance forming the subject-matter of another application, filed July 26, 1895, Serial No. 557,236.) A mixture of wood-spirit and acetone is useful in connection with all of these substances.

Solid solvents are seldom employed outside of the stiffer mixtures, because such mixtures generally depend for their valuable properties on their plasticity under heat, and their economical production in masses involves the employment of a small proportion of solvent to the pyroxylin. These new solid solvents or their recommended combinations may be substituted for camphor, and, as to the proportions to be used, the stronger solvents can be employed alone just as camphor has been heretofore used. The weaker ones (sulfobenzid and sulfocarbanilid) can be employed with camphor in proportions, say, of about three parts camphor and one part of the new group. When one or more members of the new group are employed, the stronger solvents (sulfonal and trional) can be used in almost any proportion with the camphor. The total amount of solid solvent, however, no matter what the mixture is, should be about the same as the amount of camphor heretofore employed in these compounds. While some of these substances are of difficult solubility in the ordinary liquid menstruum or liquid menstrua employed in this art, I have found that when mixed with camphor, and especially with an excess of camphor, they are sufficiently soluble for practical work. The employment of my new solvents is not incompatible with the use of other solid solvents in connection with them should the necessities of the case require such mixtures. Sulfonal is especially compatible with acetanilid. Sulfobenzid also forms a solvent with acetanilid.

It will be evident to the experienced operator in this art that, as the plasticity of the seasoned pyroxylin compound made with these new solvents or new solvent mixtures depends on the solvent power of the camphor acting in conjunction with them, any heating of these compounds when in a dry or seasoned condition, even in the presence of liquid solvents, (the liquid solvent being insufficient in itself to give the desired plasticity to the compound,) is a use of the solvents of this specification. It is also true that, regardless of the process used or in what order the ingredients are mixed, the presence at any time of my new solvents in the compound imparts properties to such compound which it would not otherwise possess and is a utilization of my invention. I do not confine myself, therefore, to the use of any particular proportions of the substances embraced in the group of my new solvents nor to any particular method in which they are used in pyroxylin compounds.

The result of my mixtures is a fluid solution or plastic mass, either of which, when properly applied, manipulated, or formed into shape and then dried by allowing the liquid solvent to evaporate, becomes a hard pyroxylin compound capable of being softened or formed into new shapes by the aid of heat and pressure in the customary manner.

By the application of heat or heat and pressure to the manipulation of these compounds I mean such operations as are commonly used in this art to mold or shape the seasoned or partly-seasoned product, whether it be by shaping in hot water, or forcing under heat through stuffing machinery, or molding in heated dies, or manipulation in heated rolls, or any analogous method.

This application is a division and rearrangement of an application filed November 7, 1895, Serial No. 568,212, and another filed July 26, 1895, Serial No. 557,236, which was done in following the requirements of the Patent Office as to the proper grouping of solvents.

Having thus described my invention, what I claim, and desire to secure by Letters Patent, is—

1. The process of manufacturing pyroxylin compounds which consists in combining pyroxylin with one or more members of the hereinbefore-specified new group of solid solvents (trional, sulfobenzid, sulfonal and sulfocarbanilid) and subjecting the mixture to heat sufficient to render the compound plastic, substantially as described.

2. The process of manufacturing pyroxylin compounds which consists in mixing pyroxylin, camphor, one or more members of the hereinbefore-specified new group of solid solvents (trional, sulfobenzid, sulfonal and sulfocarbanilid) and subsequently subjecting the resulting compound to heat sufficient to render the compound plastic, substantially as described.

3. As a new composition of matter, a pyroxylin compound containing pyroxylin and one or more members of the hereinbefore-specified new group of solid solvents (trional, sulfobenzid, sulfonal and sulfocarbanilid), substantially as described.

4. As a new composition of matter, a pyroxylin compound containing pyroxylin, one or more members of the hereinbefore-specified new group of solid solvents, (trional, sulfobenzid, sulfonal and sulfocarbanilid,) and one or more known solvents of pyroxylin, substantially as described.

5. The process of manufacturing pyroxylin compounds which consists in mixing pyroxylin, one or more members of the hereinbefore-specified new group of solid solvents (trional, sulfobenzid, sulfonal and sulfocarbanilid) and one or more known solvents of pyroxylin sufficient in amount to make a pyroxylin compound or solution, substantially as described.

In witness whereof I have hereunto signed my name this 29th day of July, 1896.

JOHN H. STEVENS.

In presence of—
ABRAHAM MANNERS,
PETER J. GALLEN.